United States Patent Office 3,806,496
Patented Apr. 23, 1974

3,806,496
NOVEL POLYMERIC COMPOSITIONS AND
THEIR PREPARATION
Leonard Marshall Shorr, 39 Palmach St., Romema, and
Jacques A. Waterman, 20a Zidkiahu St., both of Haifa,
Israel
No Drawing. Continuation-in-part of abandoned application Ser. No. 3,209, Jan. 15, 1970. This application July
13, 1972, Ser. No. 271,563
Int. Cl. C08f 15/40
U.S. Cl. 260—78.5 B                          25 Claims

ABSTRACT OF THE DISCLOSURE

New polymers with a wide M.W. distribution, adapted for compounding into polymeric compositions, are obtained by a free radical initiated polymerization of a charge containing at least three different monomeric compounds defined as Group A, Group B and Group C compounds which are all olefinic and selected from among three different groups of compounds. The Group A compounds correspond to the general formula

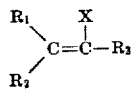

where $R_1$, $R_2$, $R_3$ are each hydrogen or fluorine and X is hydrogen, halogen acetoxy or formoxy. The Group B compounds are allylic hydrocarbons which may be alkyl substituted, and the Group C compounds are selected from a large variety of compounds with two or more olefinic groups not in conjugation and having a reactivity ratio $r_1$ relative to the Group A compound smaller than 10 and a reactivity ratio $r_2$ relative to the Group A compound equal to or smaller than 3.

---

This is a continuation of application Ser. No. 3,209, filed Jan. 15, 1970 now abandoned.

The present invention concerns new polymers and their preparation by free radical initiated polymerization.

Certain vinylic polymerization products suffer from disadvantages which may be in part overcome by introduction of a monoallylic comonomer. However, the use of such monoallylic monomers in polymerization processes has given rise to limitations. The purpose of the present invention is to overcome these limitations.

Vinyl chloride homopolymers are known to be rigid materials characterized by a substantial resistance to chemical attack. However, resinous compositions containing only homopolymers of vinyl chloride have poor flow characteristics and are of poor stability under dynamic processing conditions and, therefore, difficult to mould or to flux. Moreover, to overcome the relatively poor heat stability of vinyl chloride homopolymers, rigid resinous compositions thereof have to include stabilizing additives. Such additives, however, are not acceptable in all products, such as those which come in contact with foods and pharmaceuticals.

Attempts to improve the processing characteristics of polyvinyl chloride have involved the incorporation of so called external plasticizers or the formation of polyblends, i.e. mixing the polymer with a plasticizer or with other polymers. However, all these procedures usually have proven unsatisfactory, be it because any improvement achieved was at the expense of sacrificing some other desirable physical properties, such as clarity, impact toughness, rigidity or chemical resistance, or be it because the products so obtained are economically unattractive for many applications because of the additional time-consuming post-polymerization formulation and compounding that are necessary.

In view of the above shortcomings of homopolymeric vinyl chloride, attempts have been made to copolymerize vinyl chloride in order to obtain in this way products of better properties. In accordance with one proposal, vinyl chloride in copolymerized with propylene. Thus, according to British patent specifications Nos. 1,096,887 and 1,096,889, vinyl chloride is copolymerized with up to 10% by weight and preferably 3 to 7% by weight of propylene and the products obtained are claimed to be rigid and to possess desirable processability. Similar products are also described by H. D. Deanin, "Vinyl Chloride-Propylene Copolymers," Society of Plastic Engineers, vol. 23, May 1967, page 50, who shows that, on the one hand, the molecular weight of the copolymer measured by the intrinsic viscosity depends inversely on the propylene content and, on the other hand, at a temperature of 65° C., which is often encountered in the polymerization techniques, no useful product with suitable molecular weight can be obtained with a propylene content higher than 5%. Such a limitation of the relative proportion of the comonomer restricts, however, a priori, the range of products that can be obtained in this way. In particular, the flow under dynamic processing conditions, though much better than that of vinyl chloride alone, is still too low for certain uses.

It is also known that free radical polyethylene has poor optical properties, which lead to haziness of the compounds made therefrom. It is further known that the addition of small amounts of an olefinic comonomer such as propylene, leads to improved transparency, flexibility, flow and to an increased elongation capacity of the polymeric product. However, the amount of propylene which can be introduced is very limited if a solid polymer of high molecular weight is to be obtained.

It is furthermore known that polymers of vinylacetate are not resistant to hydrolysis. By copolymerizing vinylacetate with a non-hydrolysable allylic compound like propylene, the resistance to hydrolysis as well as the resistance to alkali is increased. Besides, the flexibility is improved, in particular at temperatures between room temperature and zero degrees Celsius and upon partial hydrolysis the flexibility of the polymers is better retained. However, here again the amount of propylene which can be introduced is very limited if a solid non-sticky polymer of high molecular weight and of a high solvent resistance is to be obtained.

It is thus seen that certain of known homopolymers and copolymers of vinylic monomers are unsatisfactory and it is the object of the present invention to provide new and improved polymers from vinyl monomers.

In accordance with the invention there are provided new polymer compositions resulting from the free radical initiated polymerization of a charge comprising:

(a) At least one monomeric compound of the group of substituted ethylenes having the formula

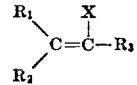

(I)

in which $R_1$, $R_2$ and $R_3$ are each hydrogen or fluorine and X is halogen, an acetoxy radical or a formoxy radical (Group A compound);

(b) At least one monomeric allylic hydrocarbon compound chain comprising in its skeleton the grouping

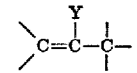

(II)

in which Y is a hydrogen, halo or carbyl radical, which may be alkyl substituted and which compound is mono-olefinic and undergoes homolytic fission without alteration of the above grouping under conditions which normally give free radical initiation (Group B compound); and (c) From 1 p.p.m. to 5% by weight of at least one monomeric compound characterized by having two or more olefinic groups not in conjugation and a reactivity ratio $r_1$ relative to said compound of Group A, smaller than 10, and a reactivity ratio $r_2$ relative to said compound of Group A, equal to or smaller than 3 (Group C compound).

In this specification and the appended claims, the term "carbyl radical" connotes any saturated radical

i.e. a radical which is linked to the backbone through a carbon atom, irrespective of the substitution of this atom.

In our Israel patent application No. 29,817 of Apr. 14, 1968, and corresponding foreign applications (Canadian No. 45,958 of Mar. 17, 1969, French No. 6911420 of Apr. 14, 1969, German No. 1,916,058 of Mar. 28, 1969, British No. 137,778/69 of Mar. 17, 1969, Dutch No. 6905570 of Apr. 10, 1969, Italian No. 15,490 A/69 of Apr. 12, 1969 Japanese No. 44–28/331 of Apr. 14, 1969, and U.S. No. 808,652 of Mar. 19, 1969) we have described and claimed a related process which differs, however, from the one according to the present invention in the nature of the Group C compounds. Many of the Group C compounds used in accordance with said earlier invention have a tendency to reduce the yield due to their fast polymerization. The present invention is thus distinguished from our earlier one by a different selection of the Group C compounds.

The reactivity ratios $r_1$ and $r_2$ of two monomers $M_1$ and $M_2$ are factors whose numerical values express the reactivity of the two monomers with respect to each other during copolymerization. They are quantitative measures of the related tendencies of the two monomers to add to a radical ending in one or the other monomer unit. Thus, a small value $r_1$ ($r_1<1$) means that $M_2$ adds more readily than $M_1$ to a radical ending in an $M_1$ unit and a large value of $r_2$ ($r_2>1$) means that $M_2$ adds more readily than $M_1$ to a radical ending in an $M_2$ unit and, conversely, a small value of $r_2$ ($r_2<1$) means that $M_2$ adds less readily than $M_1$ to a radical ending in an $M_2$ unit.

It is possible to determine the values of $r_1$ and $r_2$ from the copolymer composition as a function of the monomer feed composition by means of the equation:

$$\frac{dM_1}{dM_2} = \frac{r_1 \frac{M_1}{M_2}+1}{r_2 \frac{M_2}{M_1}+1}$$

where $dM_1/dM_2$ represents the molar ratio of the two monomers $M_1$ and $M_2$ in the increment of the polymer formed when the ratio of unreacted monomers is $M_1/M_2$. The former ratio obviously differs in general from the latter. Hence, in dependency on the molar feed ratio $M_1/M_2$ and on the values or $r_1$ and $r_2$, the unreacted monomer ratio will usually change as the polymerization proceeds and this will give rise to a continuous changing of composition of the polymer formed at each instant. Details on the methods for measuring $r_1$ and $r_2$ have been described in literature, e.g. M. Fineman and S. D. Ross, J. Polym. Sci. 5 (1950) 259, and tables of numerical values of $r_1$ and $r_2$ have been published. In the following Table I there are given some figures of the reactivity ratio with respect to some monomers involved in the present invention. In the Table $M_1$ stands for the Group A compounds and $M_2$ for the Group C compounds.

TABLE I.—REACTIVITY RATIOS OF COPOLYMERIZATION OF GROUP A WITH GROUP C COMPOUNDS

| $M_1$ (Group A compound) | $M_2$ (Group C compound) | $r_1$ | $r_2$ |
|---|---|---|---|
| Vinyl acetate | Diallyl phthalate | 0.72 | 2.0 |
| Do | N-N-diallyl melamine | 1.44 | 0.20 |
| Do | Triallyl cyanurate | 0.71 | 0.62 |
| Do | Triallyl isocyanurate | 0.91 | 0.75 |
| Do | N,N-divinyl aniline | 0.1 | 2.0 |
| Do | Divinyl formal | 1.0 | 1.0 |
| Do | Divinyl ethanol | 1.0 | 1.0 |
| Do | Diviny butyral | 1.0 | 1.1 |
| Do | Divinyl isobutyral | 1.0 | 0.99 |
| Do | Divinyl isoamylal | 1.0 | 0.99 |
| Do | Divinyl amylal | 1.0 | 0.99 |
| Do | Nor-bornadiene [1] | 0.8 | 1.3 |
| Do | Vinyl cinnamate | 0.04 | 1.20 |
| Vinyl chloride | Nor-bornadiene | 0.74 | 0.35 |
| Do | Divinyl acetal | 1.6 | 0.54 |
| Do | Divinyl butyral | 1.6 | 0.54 |
| Do | Divinyl ether | 0.89 | 0.13 |
| Do | Divinyl formal | 1.6 | 0.54 |
| Do | Divinyl iso-amylal | 1.6 | 0.54 |
| Do | Divinyl iso-butyral | 1.6 | 0.54 |
| Do | Divinyl sulphone | 0.39 | 0.71 |
| Do | Vinyl cyclohexene | 0.51 | 0.067 |
| Do | Diallyl n-butyl phosphonate | 0.79 | 1.18 |
| Do | Triallyl cyanurate | 1.7 | 0.14 |
| Do | N,N-diallyl melamine | 2.1 | 0.13 |
| Do | Diallyl phenyl phosphonate | 0.82 | 1.14 |
| Do | Diallyl phthalate | 1.03 | 0.94 |
| Do | Triallyl isocyanurate | 3.4 | 0.15 |
| Do | Vinyl undecenoate | 1.06 | 0.36 |

[1] Nor-bornadiene=bicyclo (2,2,1)-hepta-(2,5)-diene.

The Group C compound is added within the stipulated range of from 1 p.p.m. to 5% by weight but preferably in amounts below gelation quantities. The determination of the gel point concentration for a given charge is a simple experimental operation. The Group C monomers may further, in addition to the non-conjugated double bonds, comprise conjugated double or tertiary bonds.

The Group C compounds suitable for the present invention can be found for example among the following compounds:

(I) Bi- or multifunctional allylic or vinylic compounds which may, if desired, contain hetero atoms, in particular, phosphorus, nitrogen, sulfur, silicium, such as for example:

(a) Di- or tri-allylic or/and methallylic esters of aliphatic or aromatic di- or tri-carboxylic acids, for example: the diallyl or triallyl esters of phthalic acid, adipic acid, oxalic acid, pimelic acid, sebacic acid, aconitic acid, fumaric acid, maleic acid and diallyl carbonates, such as diethylene glycol bis(allyl carbonate).

(b) Allyl-, vinyl-, or methallyl ether monomers, for example: allyl allyloxypropionate, glycerol triallyl ether, ethylene glycol diallyl ether.

(c) Divinyl acetals and divinyl ketals, for example: divinyl formal, divinyl amylal.

(d) Phosphorus containing ester compounds. Examples of these compounds are diallyl allyl phosphonate, diallyl phenyl phosphonate, triallyl phosphate, triallyl phosphite, trimethallyl phosphate, magnesium diallyl phosphate.

(e) Nitrogen containing polyallylic compounds, such as for example:

(i) poly N-allyl amines or poly N-methallylamines for example: diallyl amine, diallyl aniline, N,N'-diallyl piperazine.

(ii) poly N-allyl polyamines.

(iii) diallyl cyanamide.

(iv) allyl S-triazine monomers such as triallyl cyanurate, triallylisocyanurate, diallyl melamine.

(v) polyallyl melamines and polyallyl ureas.

(f) diallyl, dimethally and allyl methallyl sulfides.

(g) silicium containing compounds such as diallyl silanes.

(II) Mono allyl, -methallyl or -vinylic esters of certain unsaturated monocarboxylic acids, for example β-substituted acrylic acids, such as crotonic acid, cinnamic acid, and, for example, maleopimarate acid anrydride.

(III) Unsaturated carboxylic acids or alcohols with more than one non-conjugated double bond, and their esters, for example, linoleic acid, linoleic-arachidonic acid and garlic acid, their mixed esters, such as linseed oil; terpene alcohols, e.g. farnesol, geraniol and nerol; and their esters, for example geranyl acetate.

(IV) Heterocyclic divinyl compounds, for example, 3,9-divinyl-spiro-bis-m-dioxane.

(V) Monomeric unconjugated hydrocarbon compounds such as for example:

(a) Open chain hydrocarbon unconjugated di- or tri-olefins which may be symmetrical or non-symmetrical, linear or branched, for example: 1-4 pentadiene, 2-methyl 1-4 pentadiene, 1-4 hexadiene, 1-5 hexadiene, 6-methyl-1-5 heptadiene, 2-6 disubstituted 1-6 heptadienes, 1–9 octadecadiene, 11-ethyl tridecadiene-1,11, linear trienes, such as 1,4,9-trans-n-decatriene and certain non-cyclic terpene hydrocarbons such as the dehydration products of terpene alcohols, for example, citronellol.

(b) unconjugated cyclic and bicyclic hydrocarbon di- or tri-olefins, for example:

(i) nor-bornadiene and its derivatives such as 2,5-nor-bornadiene (=bicyclo-2,2,1-hepta-2,5 diene), 2-alkyl-2,5-nor-bornadienes.
   (ii) norbornene-derivatives such as alkylene norbornenes, 5-vinyl-norbornene, 5-ethylidene-2-norbornene, 5-methylene-2-norbornene, methyl-butenyl norbornenes, the Diels-Alder adducts of norbornadiene with aliphatic dienes such as isoprene.
   (iii) polyalkenyl cycloalkanes, for example trivinyl cyclohexanes, 1,2 divinyl cyclobutane.
   (iv) other compounds suitable for this polymerization such as 4-vinyl-1-cyclohexene and dipentene.

The choice of the Group C compounds from the above groups is determined by several factors, such as reactivity ratio towards Group A, its influence on the molecular weight, dynamical flow and heat resistance of the products, all of which can be established in small and simple experiments.

The preferred range for the content of the Group C compound depends on its nature. For example, for the di- or triallylic compounds it is 0.03–1% by weight, for norbornadiene 0.25–4% and for allyl crotonate 0.03–0.5% by weight of the total monomer charge.

Examples of Group A compounds are tetrafluoroethylene, chlorotrifluoroethylene, vinyl chloride, vinyl fluoride, vinyl bromide, vinylidene fluorine, vinyl acetate and vinyl formate.

Examples of Group B compounds are propylene, isobutylene, 1-butene, methyl-pentenes, and amylenes.

The choice of the amounts of Group A and Group B compounds depends on the desired properties of the final products. For example, if the Group A compound is vinyl chloride and the Group B compound is propylene, a relatively low bound propylene content (1–4% by weight) will yield hard products with a high degree of stiffness and a high heat distortion temperature. Incorporation of more bound propylene (4–20% by weight) will yield products with improved flow properties, processibility, thermal stability and flexibility. In general, more than 50% by weight of bound propylene in the products is undesirable.

The invention also provides a process for the preparation of novel polymeric compositions, comprising preparing a charge containing at least one compound of Group A, at least one compound of Group B, at least one compound of Group C in an amount within the range of 1 p.p.m. to 5% by weight, and, if desired, polymerization catalysts, submitting the charge to conditions inducive of free radical initiation, allowing solution, suspension, emulsion, bulk or precipitation polymerization to proceed and recovering a polymer from the reaction mixture.

The term "precipitation polymerization" includes both heterogeneous bulk polymerization as well as polymerization carried out in a liquid which is a non-solvent for the polymer, and also covers cases in which the polymer is insoluble in the monomer mixture.

The pressure used in the course of the process is dependent on the vapor pressure of the monomers and other components employed and on the polymerization temperature.

The temperature may be varied within wide limits as is conventional with free radical initiated polymerization.

In accordance with one embodiment of the invention the total amount of all the compounds of Groups A, B and C is incorporated in the initial charge.

In accordance with another embodiment, the compound(s) of Group A, of Group B and/or of Group C is or are added continuously or in portions as the polymerization proceeds.

In accordance with yet another embodiment, only part of the Groups A and B compounds are added initially together with the totally required amount of Group C compound(s), and the remainder of the Groups A and B compounds are added subsequently as the polymerization proceeds. This procedure may in certain cases give rise to a further increase of the molecular weight.

It is also possible to select two Group C compounds one of which is added initially while the other is added to the reaction mixture as the polymerization proceeds.

The polymerization in accordance with the invention may be carried out batchwise, continuously or in steady state. A continuous polymerization may be carried out in a simple reactor, like a pipe reactor, or in a train of stirred reactors. The steady state embodiment may, for example, be carried out in a single, stirred reactor.

Where the charge comprises a polymerization initiator or a catalyst, the latter can be selected from any of the commonly available compounds which are known in the art to induce free radical initiation. The polymerization catalysts which produce free radicals may also be used in combination with another, non-free radical initiator, such as a cationic catalyst.

Alternatively, physical excitation, such as photo-polymerization or radiation-induced reaction may be employed.

The invention enables to use a relatively high proportion of compounds of Group B which is of great advantage in view of the fact that some of these compounds are relatively cheap.

The novel polymer compositions of this invention are generally characterized by a high molecular weight and are amenable to a desired molecular weight distribution. The molecular weight of the polymers in composition according to the invention depends on the kind of Group C compound chosen, its concentration and the reaction conditions employed. An additional particularly important feature of some of these polymer compositions is their improved processibility, heat stability, surface properties and transparency.

The selection of the molecular weight distribution is important. A wide molecular weight distribution favors processibility, but too high a concentration of low molecular weight fractions gives rise to decreased strength and thermal stability. On the other hand, too high a concentration of very high molecular weight fraction may spoil processibility and flow. These factors must be considered in view of the intended use of the product.

As the compounds of Group C comprise a di- or polyolefinic system, a modification of the polymer composition is possible by further reaction of the residual unsaturation or of any of the functional groups, e.g. further polymerization, chain branching, intermolecular reaction, association, salt formation and the like. The products obtained in this manner may be prepared into resinous compositions for moulding, extrusion and other operations for which conventional polymers are unsuitable.

The polymer compositions according to the invention may be pigmented. Any pigment commonly employed in coloring polyvinyl compositions may be used and incorporated in the usual manner. Examples of such pigments are carbon black, titanium dioxide and the like, depending on the color, if any, desired in the final product. This is especially important in cases where a high relative proportion of propylene or other Group B compounds are used.

The novel polymer compositions according to the invention may be compounded into resinous compositions employing fibrous or non-fibrous fillers. The fibrous fillers which may be used include asbestos, glass fibres, cotton, mineral wools, etc. Useful non-fibrous inorganic fillers include many materials that are commonly used as fillers in the plastic industry such as, for example, calcium carbonate, carbon, calcium sulphate, barium sulphate, silica, kaolin, fuller's earth, magnesium oxide and magnesium silicate. In addition, the resinous compositions may comprise plasticizers of the kind commonly employed with vinyl chloride resins, as well as extenders, lubricants, stabilizers, solvents, liquid fillers, gaseous fillers, binders and the like, of the kind commonly employed in the polyvinyl chloride area.

The invention is illustrated by the following examples to which it is not limited.

EXAMPLE 1.—BULK POLYMERIZATION

In a glass pressure tube which had been swept with nitrogen, a charge of monomer is introduced comprising in admixture a compound of Group A, a compound of Group B, a compound of Group C and an initiator. The charge may be ready mixed or admixed in situ. After the introduction of the charge, the tube is again swept with nitrogen, closed and polymerization is performed under rectilinear magnestic stirring at a temperature of 65° C. In the case of vinyl chloride-propylene, the polymer formed is insoluble in the monomer mixture, giving precipitation polymerization, but in the case of vinyl acetate-propylene the polymer formed is soluble in the starting monomer mixture.

After the completion of the reaction, the mixture is cooled and residual monomers are distilled off.

The above experiment is repeated with different mixtures and different initiators and blank tests are run with charges not including a Group C compound.

Except where mentioned otherwise, the polymers with vinyl chloride obtained are soluble in tetrahydrofuran. For purification they are therefore dissolved in this solvent and re-precipitated with methanol, with methanol-HCl or with petroleum ether.

After washing with methanol or with petroleum ether and drying in vacuo at 60° C., the intrinsic viscosity is measured in cyclohexanone at 25° C. The polymers with vinyl acetate were dissolved in benzene and purified by steam-stripping and dried in vacuo at 60° C. Their intrinsic viscosity is measured in toluene at 25° C.

Details of various experiments conducted in this way and the results obtained are given in the following Table II.

In this table and the subsequent examples the following abbreviations are used for Group C compounds:

DAMgP—diallyl magnesium phosphate
DAM—diallyl maleate
TAP—triallyl phosphate
NBD—norbornadiene TABLE II.—RESULTS OF POLYMERIZATION WITH AND WITHOUT A MONOMER OF GROUP C AT 65° C.

[Catalyst —0.2% by weight of azo-bisisobutyronitrile (AIBN)]

| Experiment No. | Group A compound | Parts by weight | Group B compound | Parts by weight | Goup C compound | Parts by weight | Time in hours | Yield in percent | Intrinsic viscosity, dl./g. | Bound propylene, percent wt. |
|---|---|---|---|---|---|---|---|---|---|---|
| 1 | Vinyl chloride | 93 | Propylene | 7 | | | 18 | 84 | 0.53 | 2.7 |
| 2 | do | 93 | do | 7 | | | 20 | 80 | 0.53 | |
| 3 | do | 93 | do | 7 | DAMgP | 0.1 | 16½ | 79 | 0.66 | 2.8 |
| 4 | do | 93 | do | 7 | TAP | 0.4 | 20½ | 91 | Gel | |
| 5 | do | 93 | do | 7 | TAP | 0.04 | 16¼ | 75 | 0.65 | 3.0 |
| 6 | do | 93 | do | 7 | DAM | 0.4 | 19½ | 80 | Gel | |
| 7 | do | 93 | do | 7 | DAM | 0.04 | 3¾ | 43 | 0.62 | 2.0 |
| 8 | do | 93 | do | 7 | DAM | 0.04 | 20 | 80 | 0.56 | 3.6 |
| 9 | do | 93 | do | 7 | NBD | 4.0 | 24 | 55 | 1.0 | |
| 10 | do | 93 | do | 7 | NBD | 0.5 | 24 | 77 | 0.60 | 3.9 |
| 11 | do | 93 | do | 7 | NBD | 2.0 | 24 | 60 | 0.69 | 4.0 |
| 12 | Vinyl acetate | 90 | do | 10 | DAM | 0.1 | 24 | 80 | 0.48 | 6.0 |
| 13 | do | 90 | do | 10 | | | 21 | 71 | 0.44 | 5.5 |

As can be seen from the above table, in Experiments 1 to 11 and Group A compound was vinyl chloride and the Group B compound propylene. The first two experiments were blank tests carried out without a Group C compound. It is seen that the intrinsic viscosities of the products obtained by the blank tests are lower than that of the products obtained in accordance with Experiments 3 to 11 in which a Group C compound was used. In Expericents 12 and 13 the Group A compound was vinyl acetate and the Group B compound again propylene. Experiment 13 was a blank test in which no Group C compound was used and the intrinsic viscosity of the product is lower than that of the products of Experiment 12 where a Group C compound was used.

EXAMPLE 2.—SUSPENSION POLYMERIZATION (A) Suspension polymerizations were carried out in a 1½ liter glass pressure reactor fitted with a rectangular blade stirrer operating at 800 r.p.m. A solution of suspending agents in de-aerated distilled water was placed in this reactor; then the initiator and Group C compounds were added, the reactor was closed and flushed with nitrogen. Liquid vinyl chloride and propylene were then entered into the reactor in that order under nitrogen pressure. Stirring was started and the reactor was heated to the operating temperature of 60° C. After thirteen hours at 60° C. heating was stopped and the reactor was allowed to cool overnight while stirring continued. The excess gases were vented off, the polymer removed, washed with distilled water and dried with air at 60° C. by the fluidized bed technique.

Two suspension recipes were used:

| | Recipe I (in grams) | Recipe II (in grams) |
|---|---|---|
| Vinyl chloride (Group A compound) | 308 | 276 |
| Propylene (Group B compound) | 22.3 | 58 |
| Water | 620 | 620 |
| Sodium tripolyphosphate | 0.70 | 0.70 |
| Methocel 65 Hg, 50 cps. (a water-soluble cellulose methyl ether, Dow Chemicals) | 0.44 | 0.44 |
| Tensaktol A (Na salt of di-decyl disulphonimide as a 65% aqueous solution) | 0.10 | 0.10 |
| Mg sulfate heptahydrate | 0.70 | 0.70 |
| Dilauroyl peroxide | 1.00 | 1.00 |
| Group C compound | (¹) | (¹) |

¹ As indicated.

Comparison blanks were run under identical conditions but with exclusion of the Group C compound. Moreover, two stage runs were performed in such a way that for the first three hours the reaction was run with a fourfold concentration of Group C compound and initiator in the organic phase, and the two stage runs without Group C compound for comparison. This was achieved by initially adding the total amount of the Group C compound and only a quarter of the total amount of each of the Groups A and B compounds. After this period the rest of the Groups A and B compounds was added. The total reaction period was the same as in the normal single stage runs.

The results are as follows:

| Experiment No. | Group C compound used— | Group C compound concentration [1] | Yield, percent | Wt. percent propylene | Intrinsic viscosity, dl./g. |
|---|---|---|---|---|---|
| 34 | | | 56 | 2.6 | 0.63 |
| 35 [2] | | | 47 | 2.6 | 0.70 |
| 36 | Diallyl maleate | 0.1 | 55 | 2.4 | 0.81 |
| 37 [2] | do | 0.1 | 47 | 2.2 | 0.80 |
| 38 [3] | Norbornadiene | 0.5 | 48 | 2.7 | 0.84 |

[1] Wt. percent of total monomers.
[2] Two stage runs.
[3] AIBN 0.95 g. instead of dilauroyl peroxide.

| Experiment No. | Recipe | Group C compound used— | Group C compound concentration [1] | Yield, percent | Wt. percent propylene | Intrinsic viscosity, dl./g. |
|---|---|---|---|---|---|---|
| 14 | I | Blank | None | 68 | 3.6 | 0.59 |
| 15 [2] | I | do | None | 66 | 3.1 | 0.63 |
| 16 | I | DAM | 0.1 | 63 | 3.3 | 0.74 |
| 17 [2] | I | Norbornadiene | 0.5 | 58 | 3.7 | 0.75 |
| 18 | I | 2-5 dimethyl, 1-5 hexadiene | 0.2 | 55 | 3.5 | 0.65 |
| 19 | I | Linseed oil | 0.3 | 40 | 3.7 | 0.65 |
| 20 | II | Blank | None | 25 | 7.5 | 0.40 |
| 21 | II | Diallyl succinate | 0.15 | 25.5 | 7.3 | 0.47 |
| 22 | II | DAM | 0.18 | 29 | 7.2 | 0.55 |
| 23 | II | Diallyladipate | 0.50 | 24 | 8.3 | 0.54 |
| 24 | II | Triallylphosphite | 0.10 | 25 | | 0.45 |
| 25 | II | do | 0.50 | 25.4 | 7.5 | 0.61 |
| 26 | II | Triallylcyanurate | 0.10 | 27 | | 0.46 |
| 27 | II | do | 0.20 | 27 | 7.5 | 0.63 |
| 28 | II | Diallylphthalate | 0.15 | 24 | | 0.45 |
| 29 | II | 1,2,4-trivinyl cyclohexane | 0.44 | 19 | 7.5 | 0.44 |
| 30 | II | 1-5 hexadiene | 0.20 | 26 | 7.5 | 0.44 |
| 31 [2] | II | Norbornadiene | 0.50 | 29 | 7.2 | 0.44 |
| 32 | II | Allylcrotonate | 0.05 | 27 | 7.5 | 0.42 |
| 33 | II | do | 0.40 | 23 | 7.4 | 0.56 |

[1] Wt. percent of total monomers.
[2] Two stage runs.

(B) Following the same procedure as in part (A) of this example, suspension polymerization runs were performed in a one-gallon blue-glass line Pfaudler reactor operating with an anchor type stirrer running at a fixed speed of 360 r.p.m. Either dilauroyl peroxide or azobisisobutyronitrile (AIBN) were used as initiators. Comparison blanks were run under identical conditions but with exclusion of the Group C compound. Also some two stage runs were performed by initially adding the total amount of the Group C compound (and one without the Group C compound for comparison) and only a quarter of the total amount of vinyl chloride (Group A compound) and propylene (Group B compound). After three hours the rest of the Groups A and B compounds was added. The total reaction period was the same as in the normal stage runs, viz thirteen hours at 60° C. The recipe was as follows:

|  | G. |
|---|---|
| Vinyl chloride (Group A compound) | 1232 |
| Propylene (Group B compound) | 75 |
| Water (distilled, de-aerated) | 2370 |
| Sodium tripolyphosphate | 44.5 |
| Methocel 65 Hg-50 cps. (ex. Dow) | 0.656 |
| Tensaktol A (BASF) | [1] 0.262 |
| Mg Sulfate heptahydrate | 2.68 |
| Dilauroyl peroxide | 2.7 |

[1] Na salt of di-decyl disulphonimide as a 65% aqueous solution ex BASF AG Ludwigshafen.

Group C compound as indicated. The results are as follows:

(C) Suspension polymerizations were carried out in the same 1½ liter glass pressure reactor as described in part (A) of this example, under the same conditions of stirring and using recipe II but with the difference that also 0.14 g. 30% $H_2O_2$ and 0.103 g. NaOH, added with the water, and 0.22 g. ethyl chloroformate, dissolved in the Groups A and B compounds, were introduced. Four runs were performed at 60° C. during 13 hours or 24 hours in presence or absence of a Group C compound.

| Experiment No. | Group C compounds Type | Concentration percent wt. of total monomer | Time in hours | Yield, percent | Wt. percent bound propylene | Intrinsic viscosity, dl./g. |
|---|---|---|---|---|---|---|
| 39 | None | 0 | 13 | 41 | 7.8 | 0.39 |
| 40 | DAM | 0.15 | 13 | 42 | 7.8 | 0.46 |
| 41 | DAM | 0.18 | 24 | 57 | 8.3 | 0.49 |
| 42 | Allyl crotonate | 0.30 | 13 | 39 | 7.8 | 0.45 |

(D) Suspension polymerizations were carried out in the same 1½ liter glass pressure reactor as described in part (A) of this example, under the same conditions of stirring and using recipe I but with the difference that also 0.14 g. 30% $H_2O_2$ and 0.105 g. NaOH, added with the water, and 0.22 g. ethylchloroformate, dissolved in the Groups A and B compounds, were introduced. Three runs were performed at 60° C. during 13 hours or 24 hours, in the presence or absence of Group C compound. The results were as follows:

| Experiment No. | Group C compounds Type | Concentration, percent weight of total monomer | Time in hours | Yield, percent | Weight percent bound propylene | Intrinsic viscosity, dl./g. |
|---|---|---|---|---|---|---|
| 43 | None | 0 | 13 | 81 | 3.8 | 0.55 |
| 44 | DAM | 0.15 | 13 | 81 | 3.8 | 0.74 |
| 45 | DAM | 0.18 | 24 | 85 | 4.0 | 0.76 |

(E) Experiment No. 46

A suspension polymerization was carried out in the same 1½ liter glass pressure reactor as described in part (A) of this example, under the same conditions of stirring and using recipe II but with the difference that two different Goup C compounds, norbornadiene and diallyl maleate were used in concentrations of 0.50 and 0.18 wt. percent on total monomers, respectively. The total reaction period was 13 hours at 60° C. The yield of polymer was 21%. This polymer did contain about 7.6 wt. per-

EXAMPLE 3.—PROCESSABILITY OF PRODUCTS (A) The dynamic processability was measured for three tin-stabilized rigid compounds in a test at about 200° C. in the Brabender plastograph.

The results are as follows:

Brabender plastograph: jacket temperature 205° C.
Head: roller mixer 30 at 63 r.p.m.
Stabilizer: 2% w. Stanclere 284 (organo-tin compound) ex Pure Chemicals Ltd. Liverpool U.K.

| Experiment No. | Sample | Group C compound | Bound propylene, percent wt. | Intrinsic viscosity, dl./g. | Temp., °C. | Brabender results Minutes to degrade | Minimum torque, g.m. |
|---|---|---|---|---|---|---|---|
| 50 | Vinyl chloride homopolymer | None | 0 | 0.87 | 205 | 12.5 | 1,450 |
| 51 | Vinyl chloride/propylene copolymer | do | 2.7 | 0.84 | 205 | 23.5 | 1,400 |
| 52 | Vinyl chloride propylene polymer prepared in the presence of NBD in two stage run. | ½ percent of NBD | 2.7 | 0.84 | 200 | 28.5 | 1,000 | cent bound propylene and its intrinsic viscosity was 0.50 dl./g. A blank run in the absence of Group C compound had an intrinsic viscosity of 0.40 dl./g. and a bound propylene content of 7.5 wt. percent.

(F) Experiment No. 47

A suspension polymerization was carried out in the same 1½ liter glass pressure reactor as described in part (A) of this example, under the same conditions of stirring and using recipe II, but with the difference that the Group C compound, allyl crotonate, in a total amount of 0.4 wt. percent on total monomers was added in ten equal increments at equal time intervals over the total reaction period of 13 hours at 60° C. The yield of polymer was 20%. This polymer did contain 7.5 wt. percent bound propylene, and its intrinsic viscosity was 0.45 dl./g. The At equivalent intrinsic viscosity and propylene content the torque of a sample prepared in the presence of ½% NBD additive is lower at comparable mechanical conditions. This is due to a decreased melt fluidity and hence the sample produced shows improved flow and processability with respect to torque, as compared to the homopolymer and the vinyl chloride propylene copolymer prepared in the absence of NBD (as Group C compound) but of the same intrinsic viscosity and bound propylene content.

(B) The dynamic processability was measured for another tin-stabilized rigid compound.

Brabender plastograph: Jacket temperature 205° C.
Head: Roller mixer 30 at 63 r.p.m.
Stabilizer: 2% w. Stanclere 284 (organo-tin compound) ex Pure Chemicals Ltd., Liverpool, U.K.

| Experiment number | Sample | Group C compound | Bound propylene, percent wt. | Intrinsic viscosity, dl./g. | Temp., °C. | Brabender results Minutes to degrade | Minimum torque, g.m. |
|---|---|---|---|---|---|---|---|
| 53 | Vinyl chloride propylene polymer prepared in the presence of DAM. | 0.2% DAM | 7.4 | 0.59 | 199 | 42 | 275 | blank run had an intrinsic viscosity of 0.40 dl./g. and bound propylene content of 7.5 wt. percent.

(G) Experiments Nos. 48 and 49

Suspension polymerizations were carried out in the same 1½ liter glass pressure reactor as described in part (A) of this example, under the same conditions of stirring and using recipe I but with the difference that instead of 22.3 g. propylene, 11 g. ethylene were used as additional Group A compound and 14 g. propylene as Group B compound. Two runs were performed at 60° C. during 13 hours, respectively, in the presence and absence of 0.15 wt. percent (on total monomers) of allyl crotonate as Group C compound, giving in yields of 57 and 55%, respectively, products having intrinsic viscosities of 0.55 dl./g. (in the presence of Group C compound) and 0.49 dl./g. (in the absence of Group C compound), respectively. The bound propylene content was about 3 wt. percent and the bound ethylene content was about 1 wt. percent in both cases.

This high propylene content sample prepared according to the present invention shows very good processability viz exceptionally low torque and a long time to degrade.

EXAMPLE 4.—THERMAL STABILITY OF PRODUCTS

Two sheets were prepared in a hydraulic press at 150° C. at 75 atmosphere during ten seconds from two powder samples in the absence of a stabilizer: one of a vinyl polymer prepared in the presence of 0.15% wt. diallyl maleate ($S_1$) and one of a vinyl chloride-propylene polymer likewise prepared in the presence of 0.15% wt. of diallyl maleate but containing 6.1% wt. bound propylene ($S_2$).

| Experiment number | Sample tested | Group C compound | Bound propylene, percent wt. | Intrinsic viscosity, d.l/g. | Color after pressing |
|---|---|---|---|---|---|
| 54 | $S_1$ | 0.15% DAM | 0 | [1] 1.5 | Strong purple discoloration. |
| 55 | $S_2$ | 0.15% DAM | 6.1 | 0.56 | Virtually colorless. |

[1] After removal of gel.

The first pressed sample $S_1$ did show a strong purple-discloration whereas sample $S_2$ was virtually colorless. This test shows that the poor thermal stability under moulding conditions of a vinyl chloride-diallyl maleate copolymer is considerably improved by the incorporation of bound propylene.

We claim:
1. A free radical initiated interpolymer of:
(a) at least one monomeric compound of the group of substituted ethylenes having the formula

(I)

in which $R_1$, $R_2$ and $R_3$ are each hydrogen or fluorine and X is halogen, an acetoxy radical or a formoxy radical (Group A compound);
(b) at least one monomeric allylic hydrocarbon or halogen atom which may be alkyl substituted, bound in the polymer in an amount of up to 20% w./w. (Group B compound); and
(c) from 1 p.p.m. to 5% by weight calculated on the total monomer change of at least one monomeric compound characterized by having two or more olefinic groups not in conjugation and a reactivity ratio $r_1$ relative to said Group A compound, smaller than 10, and a reactivity ratio $r_2$ relative to said Group A compound, equal to or smaller than 3 (Group C compound);
said interpolymer having an extended branched structure.
2. Polymer composition according to claim 1, resulting from a charge in which the Group A compound is vinyl chloride and the Group B compound is propylene.
3. Polymer composition according to claim 1, resulting from a charge in which the Group A compound is vinyl acetate and the Group B compound is propylene.
4. Polymer composition according to claim 1, resulting from a charge comprising two Group A compounds.
5. Polymer composition according to claim 1, resulting from a charge in which the Group C compound is a bicyclo hydrocarbon.
6. Polymer composition according to claim 1, resulting from a charge in which the Group C compound is a monomeric open chain hydrocarbon.
7. Polymer composition according to claim 1, resulting from a charge in which the Group C compound is a diester or polyester of allylalcohol and a polycarboxylic containing acid or its salts.
8. Polymer composition according to claim 1, resulting from a charge in which the Group C compound is a diester or polyester of allylalcohol and a polycarboxylic acid.
9. Polymer composition according to claim 1, resulting from a charge in which the Group C compound is a nitrogen-containing di- or poly-allylic compound.
10. Polymer composition according to claim 1, resulting from a charge in which the Group C compound is an ester of a monoallylic alcohol with crotonic acid.
11. Process for the preparation of a polymer composition according to claim 1, comprising preparing a charge containing at least one Group A compound, at least one Group B compound, at least one Group C compound in an amount within the range of 1 p.p.m. to 5% by weight, and a polymerization catalyst, submitting the charge to conditions inducive of free radical initiation, allowing polymerization to proceed and recovering a polymer from the reaction mixture.

12. Process according to claim 11, wherein the total amount of all Group A, Group B and Group C compounds is included in the initial charge.
13. Process according to claim 11, wherein any one of the Group A, Group B and Group C compounds is added as the polymerization proceeds.
14. Process according to claim 11, wherein only part of the Group A and Group B compounds are added initially together with the total amount of the Group C compound(s) and the remainder of the Group A and Group B compounds are added subsequently.
15. Process according to claim 11, wherein two Group C compounds are used.
16. Process according to claim 15, wherein one of the Group C compounds is introduced in the initial charge and the other one is added to the reaction mixture as the polymerization proceeds.
17. Process according to claim 14, wherein part of the Group A compound and of propylene as group B compound and all of a hydrocarbon-type Group C compound are present in the initial charge and the remainder of propylene as Group B compound is added as the polymerization proceeds.
18. Process according to claim 11, wherein the Group A compound is vinyl chloride and the Group B compound is propylene.
19. Process according to claim 11, wherein the Group A compound is vinyl acetate and the Group B compound is propylene.
20. Process according to claim 11, wherein two Group A compounds are used.
21. Process according to claim 11, wherein the Group C compound is a di- or triallylic compound which is used in an amount of 0.03–1% by weight of the total charge.
22. Process according to claim 11, wherein the Group C compound is norbornadiene which is used in an amount of 0.25–4% by weight of the total charge.
23. Process according to claim 11, wherein the Group C compound is allyl crotonate which is used in an amount of 0.03–0.5% by weight of the total charge.
24. Process according to claim 11 being carried out in suspension.
25. Process according to claim 11 being carried out as precipitation polymerization.

References Cited

UNITED STATES PATENTS

| | | | |
|---|---|---|---|
| 3,763,123 | 10/1973 | Waterman et al. | 260—80.7 |
| 3,501,440 | 3/1970 | Kamio et al. | 260—77.5 |
| 3,481,908 | 12/1969 | Mortimer | 260—80.73 |
| 3,380,970 | 4/1968 | Stilmar | 260—80.8 |

FOREIGN PATENTS 1,285,231   8/1972   Great Britain.

JOSEPH L. SCHOFER, Primary Examiner

A. L. CLINGMAN, Assistant Examiner

U.S. Cl. X.R.

260—78.5 UA, 79.3 R, 80.6, 80.71, 80.73, 80.78, 80.81

UNITED STATES PATENT OFFICE
CERTIFICATE OF CORRECTION

Patent No. 3,806,496　　　　Dated April 23, 1974

Inventor(s) Leonard M. SHORR et al.

It is certified that error appears in the above-identified patent and that said Letters Patent are hereby corrected as shown below:

Column 2, lines 64-67, delete "chain............radical"

Col. 10, line 54 (in chart), delete "0.45" and insert therefore --0.54--.

Claim 1, line 15 and line 16, delete "or halogen atom".

Claim 7, line 3, delete "polycarboxylic" and insert therefore --phosphorus- --.

Signed and sealed this 1st day of October 1974.

(SEAL)
Attest:

McCOY M. GIBSON JR.　　　　　　　　C. MARSHALL DANN
Attesting Officer　　　　　　　　　Commissioner of Patents

UNITED STATES PATENT OFFICE
CERTIFICATE OF CORRECTION

Patent No. 3,806,496　　　　　Dated　April 23, 1974

Inventor(s)　Leonard M. SHORR et al

It is certified that error appears in the above-identified patent and that said Letters Patent are hereby corrected as shown below:

In the heading, "Continuation-in-part" should read --Continuation--

The assignment should be included in the heading showing an assignment to:

--Israel Mining Industries - Institute for Research and Development, Haifa Bay (near Ir. Ganim), Israel--

Insert the following in column 1:

-- Foreign Application Priority Data

January 30, 1969　　　Israel......31519 --.

Column 13, line 18, claim 1, "change" should read -- charge --.

Signed and Sealed this thirtieth Day of March 1976

[SEAL]

Attest:

RUTH C. MASON  
Attesting Officer

C. MARSHALL DANN  
Commissioner of Patents and Trademarks